United States Patent [19]

Ohtsuka et al.

[11] Patent Number: 5,959,062
[45] Date of Patent: Sep. 28, 1999

[54] POLYMER ALLOY AND A COMPOSITION THEREFROM

[75] Inventors: Yoshihiro Ohtsuka, Ohtake; Yasuhiro Oshino, Okayama-ken, both of Japan

[73] Assignee: Daicel Chemical Industries, Ltd., Sakai, Japan

[21] Appl. No.: 09/144,702

[22] Filed: Sep. 1, 1998

[30] Foreign Application Priority Data

Sep. 11, 1997 [JP] Japan ................................. 9-264915

[51] Int. Cl.$^6$ ............................................. C08G 63/00
[52] U.S. Cl. ........................... 528/176; 528/171; 528/293
[58] Field of Search ................................ 528/176, 171, 528/293

[56] References Cited

U.S. PATENT DOCUMENTS 5,045,383   9/1991   Maeda et al. ........................... 428/216

Primary Examiner—Terressa Mosley
Attorney, Agent, or Firm—Morgan & Finnegan, L.L.P.

[57] ABSTRACT

Disclosed are a polymer alloy comprising a polyester resin having a specified acid value, an epoxidized diene-based block copolymer, and an unvulcanized rubber, a composition in which an unvulcanized rubber is mixed with the polymer alloy, and parts for tires in which the composition is employed.

20 Claims, No Drawings

POLYMER ALLOY AND A COMPOSITION THEREFROM

FIELD OF THE INVENTION

The present invention relates to a polymer alloy comprising a polyester resin having a specified acid value, an epoxidized diene-based block copolymer, and an unvulcanized rubber. Further, it relates to a composition in which an unvulcanized rubber is mixed with the polymer alloy, and parts for tires in which the composition is employed.

BACKGROUND OF THE INVENTION

In rubber products, particularly, a rubber composition to be employed in tires for cars, and the like, there are particularly required functional properties compared to a general rubber composition, and there is desired an increase of modulus in the rubber composition. And, in tires, particularly, a tire tread base composition and a tire-wire coat compound compared to other materials for parts, there is desired a large modulus.

In order to improve strength, etc. in a rubber composition employed for tires, etc., there are usually mixed a large amount of fillers such as carbon black, whereby, there is also a higher degree of stiffness in a rubber composition. For example, JP-A-07165996 Official Gazette proposes a polymer alloy in relation to a polyester resin/an epoxidized diene-based block copolymer/a rubber.

However, the polymer alloy proposed in the above-described Official Gazette unsatisfactorily has a disadvantage of poor compatibility between a polyester resin and a rubber because of a low molecular weight in the epoxidized diene-based block copolymer. Further, there becomes usually caused a high level of hysteresis by mixing with a large amount of carbon black in order to improve strength. Because of the high level of hysteresis, in the case that the polymer alloy is employed for tires, there is caused an excessive thermal accumulation, resulting in that there lowers a cut growth characteristics. Also, in the case that there is tried an improvement of a degree of cure in a rubber composition by mixing a large amount of sulphur, aging resistance is occasionally apt to lower. Still further, it is also unpractical to intend to attain a high level of strength by only the improvement of a degree of cure. That is, it is exceedingly difficult to obtain a rubber composition having a high level of properties such as strength required in tires for cars, etc.

SUMMARY OF THE INVENTION

The inventors, in view of the above background, and as a result of a detailed investigation concerning composing components of a rubber composition itself, have found that there can be obtained a polymer alloy capable of solving the above-described problems by mixing a polyester resin having a specified acid value with an epoxidized diene-based block copolymer and an unvulcanized rubber, and the present invention has been completed.

A first aspect of the present invention relates to a polymer alloy which comprises a polyester resin (a) having an acid-value of 5–80 KOH mg/g, an epoxidized diene-based block copolymer (b), and an unvulcanized rubber (c).

A second aspect of the present invention relates to a composition, which is a composition in which the polymer alloy is mixed with at least one or more of an unvulcanized rubber (d) selected from the group consisting of a synthesized rubber derived from a diene-based monomer and a natural rubber, characterized in that the total amount of a polyester resin (a) and an epoxidized diene-based block copolymer (b) is 2–25 parts by weight based on 100 parts by weight of total unvulcanized rubber in the composition.

A third aspect of the present invention relates to a tread base, a tread cap, a carcass ply, a cushion, a belt ply, a shoulder wedge, a bead area, and an apex or chafer, which comprise the polymer alloy.

DETAILED DESCRIPTION OF THE INVENTION

The present invention will be described hereinafter in more detail.

According to a first aspect of the present invention, there is provided a polymer alloy which comprises a polyester resin (a) having an acid value of 5–80 KOH mg/g, an epoxidized diene-based block copolymer (b), and an unvulcanized rubber (c).

According to a second aspect of the present invention, there is provided a composition, which is a composition in which the polymer alloy is mixed with at least one or more of an unvulcanized rubber (d) selected from the group consisting of a synthesized rubber derived from a diene-based monomer and a natural rubber, characterized in that the total amount of a polyester resin (a) and an epoxidized diene-based block copolymer (b) is 2–25 parts by weight based on 100 parts by weight of total unvulcanized rubber in the composition.

According to a third aspect of the present invention, there are provided tread base, a tread cap, a carcass ply, a cushion, a belt ply, a shoulder-wedge, a bead area, and an apex or chafer, which comprise the polymer alloy.

EMBODIMENT FOR CARRYING OUT THE INVENTION (Polyester resin)

The polyester resin (a) to be employed in the present invention is composed of a dicarboxylic acid or a dicarboxylic acid derivative and a diol, and there may be mixed at least one kind or more kinds of the dicarboxylic acid or the dicarboxylic acid derivative. Further, there may be also mixed at least one kind or more kinds of the diols. The polyester resin capable of employing in the present invention can be prepared by a method which is described in, for example, U.S. Pat. No. 4,264,751 and, specifically, it is prepared by a reaction of a dicarboxylic acid or a dicarboxylic acid derivative with a diol.

As the dicarboxylic acid, there are preferred an alkyl dicarboxylic acid having a carbon number of 2–16 or an aryl dicarboxylic acid having a carbon number of 8–16 and, as the alkyl dicarboxylic acid, there can be exemplified oxalic acid, malonic acid, succinic acid, glutaric acid, adipic acid, pimelic acid, suberic acid, and sebasic acid. As the aryl dicarboxylic acid, there can be exemplified a variety of isomers which include phthalic acids such as terephthalic acid and naphthalic acids.

Further, as an alkyl-substituted aryl acid, there can be exemplified a variety of isomers of dimethyl phthalic acids such as dimethyl isophthalic acid, dimethyl orthophthalic acid, and dimethyl terephthalic acid; isomers of diethyl phthalic acids such as diethyl isophthalic acid, diethyl orthophthalic acid, and diethyl terephthalic acid, isomers of dimethyl naphthalic acids such as 2,6-dimethyl naphthalic acid and 2,5-dimethyl naphthalic acid, and isomers of diethyl naphthalic acids. Of those, there are most preferably dimethyl terephthalic acid and terephthalic acid.

As the dicarboxylic acid derivative, there can be employed a variety of diesters of the dicarboxylic acids. The dicarboxylic acid derivative is preferably an alkyl diester having a carbon number of 2–20 and an alkyl-substituted aryl diester having a carbon number of 10–20. As the alkyl diester, there can be exemplified a dimethyladipate or a derivative therefrom. As the alkyl-substituted aryl diester, there can be exemplified a variety of isomers of diethylphthalate, a variety of isomers of diethylnaphthalate, a variety of isomers of dimethylnaphthalate, and a variety of isomers (dimethylterephthalate, and the like) of dimethylphthalate. Of those, dimethylterephthalate is most preferred.

The diol composing the polyester resin (a) to be employed in the present invention is preferably a diol having a carbon number of 2–10.

The diol may be linear or branched. Specifically, there can be exemplified ethyleneglycol, propyleneglycol, trimethyleneglycol, 1,2-butanediol, 1,3-butanediol, 1,4-butanediol, 2,3-butanediol, neopentylglycol, hexamethyleneglycol, cyclohexanedimethanol, or an ester diol product of neopentylglycol.

Use amount of the diol is 2.20–1.15 times by mol, more preferably 1.7–1.5 times by mol based on the dicarboxylic acid or the dicarboxylic acid derivative.

The polyester resin (a) to be employed in the present invention can be also prepared using a chain branching agent.

The chain branching agent to be employed is a compound having at least three functional groups in the structure.

Specifically, there can be exemplified trimeritic anhydride, pentaerythritol, glycerol, trimethylolpropane, triethylolpropane, and other polyfunctional alcohols.

The use amount of the chain branching agent is preferably 0–10% by mol, more preferably 2–8% by mol based on the total amount of the dicarboxylic acid or the dicarboxylic acid derivative. In the case that the chain branching agent is pentaerythritol, glycerol, trimethylolpropane, triethylolpropane, or other polyfunctional alcohols, the chain branching agent can be supplied into a polymerization apparatus together with other components. On the other hand, in the case that the chain branching agent is trimeritic anhydride, the chain branching agent is preferably supplied after the progress of at least 90% in an esterification of the dicarboxylic acid or the dicarboxylic acid derivative with a diol.

In the preparation of the polyester resin (a), a catalyst can be employed. Specifically, there can be employed dibutyltin oxide-sodium acetate, tin octanoate, butyl hydroxyltin chloride, zinc acetate, and titanium-glycolate.

Acid value in the polyester resin (a) ranges in 5–80 KOH mg/g, and preferably 20–70 KOH mg/g. In the case that the acid value is less than 5 KOH mg/g, reactivity is low, and in the case of exceeding 80 KOH mg/g, crosslinking density is not elevated in the polymer alloy. The acid value has a relative relationship with a molecular weight. The acid value becomes lower in a higher molecular weight, and the acid value becomes higher in a lower molecular weight. The molecular weight can be controlled by changing purity of the dicarboxylic acid or the dicarboxylic acid derivative and the diol, a polymerization proportion, and polymerization conditions.

Further, intrinsic viscosity in the polyester resin (a) preferably ranges in 0.13–0.35 dl/g. In the range, workability is excellent. Still further, a glass transition temperature preferably ranges in 50–80° C. in the polyester resin (a). In the case of less than 50° C., a polymer alloy becomes too soft and, contrarily, in the case of exceeding 80° C., properties in low temperatures become lower.

(Epoxidized diene-based block copolymer)

The epoxidized diene-based block copolymer to be employed in the present invention is a compound in which an epoxidizing agent is allowed to react with a block copolymer (C) containing a polymer block (A) primarily composed of a vinyl aromatic compound and a polymer block (B) primarily composed of a conjugated diene compound or a partially hydrogenated compound, in which there are epoxidized aliphatic double bonds in the conjugated diene compound.

As the vinyl aromatic compound, there can be selected at least one or more from styrene, α-methylstyrene, vinyltoluene, p-tert-butyl styrene, 1,1-diphenylethylene, and the like. Of those, styrene is preferred.

Further, as the conjugated diene compound, there can be selected at least one or more from, for example, butadiene, isoprene, 1,3-pentadiene, 2,3-dimethyl-1,3-butadiene, and the like. Of those, there are preferred butadiene, isoprene, and the combination thereof. It is to be noted that as the proportion of the vinyl aromatic compound with respect to the conjugated diene compound, the vinyl aromatic compound is 10–70% by weight, and the conjugated diene compound is preferably 30–90% by weight.

Number average molecular weight of the block copolymer (C) preferably ranges in 5,000–1,000,000, and more preferably in 10,000–800,000. Further, a molecular weight distribution [weight average molecular weight (Mw)/ number average molecular weight (Mn)] is preferably not more than 10. Molecular structure of the block copolymer (C) may be linear, branched, radial, and any combination thereof.

A method for the preparation of the block copolymer (C), if it has the above-described structure, is not particularly limited. For example, it can be obtained by a method disclosed in JP-B-65023798 in which a vinyl aromatic compound-conjugated diene compound block copolymer is prepared in an inert solvent using a lithium catalyst. A partially hydrogenated block copolymer can be prepared by a partial hydrogenation of the block copolymer (C).

The partially hydrogenated block copolymer can be prepared by a method described in, for example, JP-B-67008704 and JP-B-68006636. Particularly, there is most preferred a partially hydrogenated block copolymer prepared by a method in which a titanium-based hydrogenation catalyst is employed. Because, it is excellent in weatherability and a thermally aging resistible property. Specifically, it is prepared by a method described in JP-A-59133203 and JP-A-60079005, in which the above-described block copolymer is hydrogenated in an inert solvent under the presence of a titanium-based hydrogenation catalyst.

In the vinyl aromatic compound-conjugated diene compound block copolymer, there are hydrogenated 0–99%, preferably 0–70% of the aliphatic double bonds derived from the conjugated diene compound. In the hydrogenation range, one molecule contains at least two epoxy groups. It is to be noted that the block copolymer (C) or the partially hydrogenated block copolymer is commercially supplied, and it can be also employed.

The epoxidized diene-based block copolymer (b) to be employed in the present invention can be also obtained by a reaction of the above-described block copolymer (C) or the partially hydrogenated block copolymer with an epoxidation agent such as hydroperoxides and peracids in an inert solvent.

As the peracids, there are enumerated performic acid, peracetic acid, perpropioic acid, perbenzoic acid, trifluoroperacetic acid, and a mixture thereof, and the like. Of these, peracetic acid is a preferred epoxidation agent, because it is manufactured on an industrial basis and it can be obtained at an economical price and has a high stability. As the hydroperoxides, there are enumerated hydroperoxide, tertiarybutyl hydroperoxide, cumenperoxide, and the like. Also, an organic acid may be employed in combination with the hydroperoxide. Further, molybdenum hexacarbonyl can be employed in combination with the hydroperoxide in order to elevate a catalytic effect.

A most appropriate amount of the epoxidation agent can be decided depending upon parameters such as kinds of the above-described epoxidation agents to be employed, epoxidation degree to be desired, and kinds of the epoxidized diene-based block copolymer. The epoxidized diene-based block copolymer (b) obtained can be isolated by a sedimentation method using a weak solvent, a method in which a solvent is removed by evaporation after feeding a polymer into hot water while stirring, and a direct solvent removal method, and the like.

(Unvulcanized rubber)

In the unvulcanized rubber (c) which is a component in the polymer alloy of the present invention, there can be employed natural rubbers, conjugated diene monomers, synthetic rubbers derived from diene-based monomers such as nonconjugated diene monomers. The conjugated diene monomers and the nonconjugated diene monomers preferably have a carbon number of 4–8.

As the conjugated diene monomers, there can be exemplified 1,3-butadiene, isoprene, 2,3-dimethyl-1,3-butadiene, 2-methyl-1,3-pentadiene, 3,4-dimethyl-1,4-hexadiene, 4,5-dimethyl-1,3-octadiene, phenyl-1,3-butadiene, and the like.

As the synthetic rubbers, there can be exemplified diene-based rubbers such as a polybutadiene,a styrene-butadiene rubber (SBR), a synthetic isoprene, natural rubbers, an isoprene-butadiene rubber, an isoprene-butadiene-styrene rubber, a nitrile rubber, a carboxylated nitrile rubber, and EPDM.

(Mixing proportion)

According to the mixing proportion as described below, there are preferably mixed the polyester resin (a) having an acid value of 5–80 KOH mg/g, the epoxidized diene-based block copolymer (b), and the unvulcanized rubber (c), which are a component in the polymer alloy of the present invention.

The polyester resin (a) preferably ranges in 10–30 parts by weight, and more preferably 15–25 parts by weight. Further, the epoxidized diene-based block copolymer (b) preferably ranges in 1–20 parts by weight, and more preferably 1–15 parts by weight. Still further, the unvulcanized rubber (c) preferably ranges in 50–150 parts by weight, and more preferably 75–125 parts by weight.

(Mixing method)

The polymer alloy of the present invention can be prepared by a method in which the epoxidized diene-based block copolymer (b) is merely mixed with a mixture composed of the polyester resin (a) and the unvulcanized rubber (c), and a method in which the epoxidized diene-based block copolymer (b) is mixed with the unvulcanized rubber (c) in a melting state, and then mixed with the polyester resin (a). The polyester resin (a), the epoxidized diene-based block copolymer (b), and the unvulcanized rubber (c) are mixed at a temperature range of usually 145–190° C., and preferably 155–175° C. It is to be noted that catalyst can be also employed in mixing. The catalyst is preferably added in a solid state before melting of the unvulcanized rubber (c).

As the catalyst, there can be exemplified a quaternary ammonium salt, a lithium salt, and dibutyltin oxide and, there is particularly preferred benzyltrimethyl ammonium chloride which is a quaternary ammonium salt. It is to be noted that the respective components can be mixed with a Banbury mixer, a rolling mixer (a mill mixer), or an extruder, and the like.

In the polymer alloy of the present invention, there can be added an anti-decomposing agent in order to prevent a diene rubber component in the epoxidized diene-based block copolymer (b) in molding. As the anti-decomposing agent, there can be exemplified monophenols, bisphenols, thiophenols, polyphenols, hydroquinone derivatives, phosphites, and a mixture thereof, thioesters, naphtylamines, diphenylamines, paraphenylene diamines, quinolines, and derivatives therefrom. The anti-decomposing agent is preferably added in an amount ranging in 0.1–10 parts by weight based on 100 parts by weight of polymer components in the polymer alloy. Further, in the case that there are employed two or more kinds of the anti-decomposing agent, for example, in the case that there are employed paraphenylene diamines and monophenols, those are preferably employed in combination in an amount range of 0.25–0.75 part by weight, respectively.

(Composition containing the polymer alloy)

The polymer alloy of the present invention can be processed as a composition for storing a material for a rubber product such as tires. A composition obtained can be employed for preparing a variety of composite materials such as tires, belts, and hoses and, particularly, it is preferably employed for preparing tires. In order to obtain the composition for storing, an unvulcanized rubber (d) may be mixed with the polymer alloy of the present invention. As a mixing proportion of the unvulcanized rubber (d) with respect to the polymer alloy, the total amount of the polyester resin (a) and the epoxidized diene-based block copolymer (b) in the polymer alloy ranges in preferably 2–40 parts by weight, and more preferably 5–25 parts by weight based on 100 parts by weight of total unvulcanized rubber in the composition.

As the unvulcanized rubber (d) which is mixed into the polymer alloy to prepare a composition, there can be likewise employed the same ones exemplified as the unvulcanized rubber (c). As the unvulcanized rubber (d) which is newly employed to prepare a composition, there can be employed the same or different ones employed as the polymer alloy. It is to be noted that it is preferred to employ the unvulcanized rubber (c) which is employed for the polymer alloy in view of an excellent compatibility.

In the composition for storing, there can be added fillers, curing accelerators, sulfuric curing agents, antidegradantant, processing oils, pigments, zinc oxide, stearic acid, stabilizers, tackifiers, plasticizers, waxes, prevulcanization inhibitors, extender oils, and the like.

As the fillers, there can be exemplified carbon black, silica, titanium dioxide, clays, and the like, and the addition amount is preferably 25–125 parts by weight based on 100 parts by weight of polymeric components in the composition.

As the curing accelerators, there can be exemplified amines, guanidines, thioureas, thiazols, thiurams, sulphene amides, dithiocarbamates, and xantates, and the addition amount is likewise preferably 0.2–5 parts by weight.

As the sulfuric curing agents, there can be exemplified element sulphur (free sulphur) or a sulphur donating vulcanizing agent, for example, amine disulfide, a high molecular weight polysulfide, or a sulphur-olein adduct, and the addition amount is, although it depends upon a type of rubber and a specified type of the sulfuric curing agents, usually, likewise preferably 0.1–5 parts by weight, and more preferably 0.5–2 parts by weight.

As the antidegradants, there can be exemplified monophenols, bisphenols, thiophenols, polyphenols, hydroquinone derivatives, phosphites, and a mixture thereof, thioesters, naphtylamines, diphenylamines, paraphenylene diamines, quinolines, mixed amines, and derivatives therefrom. The antidegradant is preferably mixed in a range of 0.10–10 parts by weight based on 100 parts by weight of polymeric components in the polymer alloy.

As the processing oils, there can be exemplified an activated dithio-bisbenzanilide, a poly-para-dinitrosobenzene, a xylylmercaptan, an aliphatic-based, a naphthene-based, and an aromatic resin, a polyethyleneglycol, petroleums, ester-based plasticizers, hydrogenated vegetable oils, pine tar, phenol resins, petroleum resins, polymeric esters, and rosins. The addition amount is preferably not more than 30% by weight.

Tires to be employed for cars are a composite material composed of a plurality of composing materials, and in a rubber composition for manufacturing tires, cords such as woven clothes, glass fibers, and steel wires, which have characteristic functions, respectively, and which show a synergetic effect.

The composition containing the polymer alloy of the present invention is suitable for employing as a rubber stock containing the alloy for tires. Particularly, it is preferably employed as a tread base, a tread cap, a carcass ply, a cushion, a belt ply, a shoulder-wedge, a bead area, and an apex or chafer, and the like. Of those, it is preferably employed in a part in which the composition containing the polymer alloy comes into contact at an interlayer with woven fibers and glass fibers in the carcass ply.

Hereinafter, although the present invention is specifically illustrated by Examples and Comparative Examples, the present invention is not limited by those.
(Methods for measurement)
  (1) In a tensile test, there were measured modulus, tensile strength in fracture, and extension according to JIS K6301.
  (2) Peeling test was carried out according to the followings.

A commercially supplied nylon resin plate or a polyester resin plate was cut into 150 mmL×50 mmW×2.5 mmT, and a composition before vulcanization was molded as a sheet state having 150 mmL×50 mmW×2.5 mmT, followed by laminating and compressing at pressure of 10 kg/cm² and 190° C. for 10 minutes to prepare a laminated composite material. Peeling test was carried out according to JIS K6301. There was made an evaluation that "x" shows a peeling at an interlayer, and "o" shows a cohesion fracture.
(Synthesis Example 1: Polyester resin)

A polyester resin was prepared by a conventional method using 21.0 parts by weight of neopentylglycol, 15.5 parts by weight of ethyleneglycol, 36.8 parts by weight of dimethyl terephthalate, 36.8 parts by weight of dimethyl isophthalate, 17.0 parts by weight of dimethyl adipate, and 6.7 parts by weight of trimethylolpropane which is a branching agent. Intrinsic viscosity in the polyester resin was 0.17 dl/g, and an acid value was 38 KOH mg/g.
(Synthesis Example 2: Epoxidized diene-based block copolymer)
  (1) A styrene-butadiene-styrene block copolymer (styrene/butadiene weight ratio=30/70) was epoxidized by peracetic acid to obtain an epoxidized diene-based block copolymer. The block copolymer was designated as the Copolymer (1). Oxirane oxygen concentration was 3.82% by weight in the Copolymer (1).
  (2) A styrene-isoprene-styrene block copolymer (styrene/isoprene weight ratio=15/85) was epoxidized by peracetic acid to obtain an epoxidized diene-based block copolymer. The block copolymer was designated as the Copolymer (2). Oxirane oxygen concentration was 2.85% by weight in the Copolymer (2).
  (3) Unsaturated carbons derived from butadiene in a styrene-butadiene-styrene block copolymer (styrene/butadiene weight ratio=30/70) were partially hydrogenated (hydrogenation ratio of 50%), followed by epoxidizing by peracetic acid to obtain an epoxidized diene-based block copolymer. The block copolymer was designated as the Copolymer (3). Oxirane oxygen concentration was 4.98% by weight in the Copolymer (3).

EXAMPLE 1

80 parts by weight of a synthesized polyisoprene was supplied into a Laboplastomill, and there was added 20 parts by weight of the polyester resin obtained in the Synthesis Example 1 while agitating under heating, and subsequently, there was added 5 parts by weight of the Copolymer (1) obtained in the Synthesis Example 2 to obtain a polymer alloy. Kneading temperature was adjusted to 160° C., and kneading time of period was adjusted to 10 minutes. The polymer alloy obtained was designated as "Alloy P1". Likewise, the same operations were followed using the Copolymer (2) and the Copolymer (3) obtained in the Synthesis Example 2 to obtain "Alloy P2" and "Alloy P3", respectively. Further, as a Comparative Example, the same operations were followed using "Araldite PT810" manufactured by Ciba-Geigy, AG in place of the epoxidized diene-based block copolymer to obtain a polymer alloy. The polymer alloy obtained was designated as "Alloy PA". Table 1 shows respective formulations. It is to be noted that unit is part by weight in values showing the formulating proportion in the Tables described hereinafter.

TABLE 1

| Name of a polymer alloy | Example 1 | | | Comparative Example 1 |
|---|---|---|---|---|
| | Alloy P1 | Alloy P2 | Alloy P3 | Alloy PA |
| Polyester resin | 20 | 20 | 20 | 20 |
| Epoxidized dien-based block copolymer | 5*² | 5*³ | 5*⁴ | —*¹ |
| Synthesized polyisoprene | 80 | 80 | 80 | 80 |

*¹: 5 parts by weight of "Araldite" was employed in place of an epoxidized diene-based block copolymer.
*², *³, *⁴: Respective epoxidized diene-based block copolymers employed in the Copolymer (1), the Copolymer (2), and the Copolymer (3) of the Synthesis Example 2.

EXAMPLE 2

100 parts by weight of the "Alloy P1" obtained in the Example 1 was mixed with 20 parts by weight of a synthesized polyisoprene which is an unvulcanized rubber (d) and 3.0 parts by weight of additives for a rubber, followed by kneading in a Banbury mixer. Subsequently, there were added 5.0 parts by weight of carbon black, 3.0 parts by weight of a processing oil, 1.0 part by weight of an antiozonant, 1.0 part by weight of a wax, 1.0 part by weight of stearic acid, 1.0 part by weight of a peptizer, 1.0 part by weight of an anti-oxidant, 30.0 parts by weight of zinc oxide, 1.0 part by weight of an accelerator for curing, and 3.0 parts by weight of sulphur to prepare a composition.

Table 2 shows results of tensile test in relation to the composition obtained. As a result, modulus increases in the composition containing the polymer alloy of the present invention.

TABLE 2

|  | Example | | | Comparative Example | |
|---|---|---|---|---|---|
|  | 2 | 3 | 4 | 2 | 3 |
| Synthesized polyisoprene | 20 | 20 | 20 | 100 | 20 |
| Alloy P1 | 100 | — | — | — | — |
| Alloy P2 | — | 100 | — | — | — |
| Alloy P3 | — | — | 100 | — | — |
| Alloy P4 | — | — | — | — | 100 |
| Tensile test |  |  |  |  |  |
| 50% Modulus (MPa) | 3.0 | 2.9 | 3.1 | 1.2 | 2.4 |
| 100% Modulus (MPa) | 5.1 | 4.2 | 4.9 | 1.8 | 4.4 |
| 200% Modulus (MPa) | 11.2 | 10.5 | 12.0 | 3.9 | 9.2 |
| 300% Modulus (MPa) | 15.9 | 14.0 | 17.1 | 7.9 | — |
| Tensile strength in fracture (MPa) | 20.9 | 19.0 | 21.3 | 28.5 | 13.5 |
| Extension (%) | 450 | 480 | 370 | 700 | 270 |

EXAMPLES 3 and 4, COMPARATIVE EXAMPLES 2 and 3

The same operations were followed as in the Example 2, except that there were employed "Alloy P2", "Alloy P3", and "Alloy P4" obtained in the Example 1 in place of the "Alloy P1" to obtain respective compositions shown in Table 2. Tensile test was likewise carried out as in the Example 2. Results are shown in Table 2.

Further, the same operations were followed as in the Example 2, except that there was employed "Synthesized polyisoprene" in place of the "Alloy P1" to obtain a composition. Tensile test was likewise carried out as in the Example 2, and which was designated as Comparative Example 2.

EXAMPLE 5

The same operations were followed as in the Example 1, except that there were employed natural rubbers in place of the Synthesized polyisoprene to obtain "Alloy N1", "Alloy N2", "Alloy N3", and "Alloy NA1". Subsequently, the same operations were followed as in the Example 2, except that "Alloy N1" was employed in place of the "Alloy P1" to obtain a composition and to carry out tensile test. Results are shown in Table 3. Modulus increases in the composition containing the polymer alloy of the present invention.

EXAMPLES 6 and 7, COMPARATIVE EXAMPLES 4 and 5

The same operations were followed as in the Example 5, except that there were employed "Alloy N2", "Alloy N3", "Alloy NA1", and "Natural rubber" which are shown in Table 3 in place of "Alloy N1" obtained in the Example 5 to obtain compositions.

Tensile test was likewise carried out as in the Example 5, and results are shown in Table 3.

TABLE 3

|  | Example | | | Comparative Example | |
|---|---|---|---|---|---|
|  | 5 | 6 | 7 | 4 | 5 |
| Natural rubber | 20 | 20 | 20 | 100 | 20 |
| Alloy N1 | 100 | — | — | — | — |
| Alloy N2 | — | 100 | — | — | — |
| Alloy N3 | — | — | 100 | — | — |
| Alloy NA1 | — | — | — | — | 100 |
| Tensile test |  |  |  |  |  |
| 50% Modulus (MPa) | 3.2 | 2.8 | 3.2 | 1.1 | 2.5 |
| 100% Modulus (MPa) | 5.0 | 4.5 | 5.2 | 1.7 | 4.3 |
| 200% Modulus (MPa) | 11.0 | 10.3 | 11.9 | 4.0 | 9.0 |
| 300% Modulus (MPa) | 15.8 | 15.0 | 18.0 | 7.8 | — |
| Tensile strength in fracture (MPa) | 21.0 | 20.1 | 22.0 | 27.9 | 14.0 |
| Extension (%) | 460 | 500 | 400 | 650 | 280 |

(Synthesis Example 3)

The same operations were followed as in the Synthesis Example 1, except that there were employed 8.3 parts by weight of dimethyl terephthalate, 8.9 parts by weight of dimethyl isophthalate, 2.5 parts by weight of dimethyl naphthalate, and 6.2 parts by weight of ethyleleglycol to prepare a polyester resin. Intrinsic viscosity in the polyester resin was 0.20 dl/g, and an acid value was 25 KOH mg/g.

EXAMPLE 8

There were melt kneaded 25 parts by weight of the polyester resin obtained in the Synthesis Example 3, 2 parts by weight of the Copolymer (1) obtained in the Synthesis Example 2, 100 parts by weight of a natural rubber, and 0.1 part by weight of benzyltrimethyl ammonium chloride at 170° C. using a twin-screw extruder to obtain "Alloy N4". 25 parts by weight of the "Alloy N4" was mixed with 32.5 parts by weight of a natural rubber in mixing proportion as shown in Table 4, and there were added 30.0 parts by weight of $TiO_2$, 2.0 parts by weight of phenyl-$\beta$-naphtylamine which is an anti-oxidant, and 2.0 parts by weight of amine disulfide which is a vulcanizer to obtain a composition. There was carried out a tensile test and an adhesive property test in relation to the composition. Results are shown in Table 4.

TABLE 4

|  | Example | | Comparative Example | | |
|---|---|---|---|---|---|
|  | 8 | 9 | 6 | 7 | 8 |
| Natural rubber | 32.5 | 22.5 | 52.5 | 32.5 | 22.5 |
| Alloy N4 | 25.0 | 37.5 | — | — | — |
| Alloy NA2 | — | — | — | 25.0 | 37.5 |
| Tensile test |  |  |  |  |  |
| 300% Modulus (MPa) | 14.0 | 15.0 | 7.9 | 8.0 | 10.0 |
| Strength in fracture (MPa) | 20.0 | 19.8 | 11.9 | 15.0 | 15.1 |
| Extension in fracture (%) | 440 | 430 | 450 | 385 | 350 |
| Adhesive property |  |  |  |  |  |
| Polyester | o | o | x | x | x |
| Nylon | o | o | x | x | x |

EXAMPLE 9, COMPARATIVE EXAMPLES 6–8

There were melt kneaded 25 parts by weight of the polyester resin obtained in the Example 8, 5 parts by weight of Araldite PT810, 100 parts by weight of a natural rubber, and 0.1 part by weight of benzyltrimethyl ammonium chloride at 170° C. using a twin-screw extruder to obtain "Alloy NA2".

There were likewise carried out a tensile test and a peeling test, except that the "Alloy NA2" or a natural rubber was employed in the amount shown in Table 4 in place of the "Alloy N4" in the Example 8, or use amount of the "Alloy N4" obtained in the Example 8 was changed to mixing amount shown in Table 4 to obtain respective compositions and to carry out the same tensile test and peeling test as in the Example 8. Results are shown in Table 4. It is to be noted that a change in a torque behavior by a rheometer was not almost observed in the Examples 2–9 and Comparative Examples 1–8.

While the invention has been described in detail and with reference to specific embodiments thereof, it will be apparent to one skilled in the art that various changes and modifications can be made therein without departing from the spirit and scope thereof.

We claim:

1. A polymer alloy comprising:

a polyester resin (a), the resin having an acid value of 5–80 KOH mg/g, an epoxidized diene-based block copolymer (b), and an unvulcanized rubber (c).

2. A polymer alloy as claimed in claim 1, wherein the mixing proportion is 10–30 parts by weight of said polyester resin (a), 1–20 parts by weight of said epoxidized diene-based block copolymer (b), and 50–150 parts by weight of said unvulcanized rubber (c).

3. A polymer alloy as claimed in claim 1, wherein said polyester resin (a) is a product prepared by a condensation reaction of a dicarboxylic acid or a dicarboxylic acid derivative with a diol.

4. A polymer alloy as claimed in claim 1, wherein said polyester resin (a) is a product prepared by a condensation reaction of a dicarboxylic acid or a dicarboxylic acid derivative, a diol with an agent for branching a molecular chain.

5. A polymer alloy as claimed in claim 4, wherein said agent for branching a molecular chain is at least one or more compound selected from the group consisting of trimellitic anhydride, pentaerythritol, glycerol, trimethylol propane, and triethylolpropane.

6. A polymer alloy as claimed in claim 4, wherein a condensation proportion by said agent for branching a molecular chain is 2–8% by mol based on said dicarboxylic acid or a dicarboxylic acid derivative.

7. A polymer alloy as claimed in claim 3, wherein (i) said dicarboxylic acid is an alkyl dicarboxylic acid having a carbon number of 2–16, or an aryl dicarboxylic acid having a carbon number of 8–16, (ii) said dicarboxylic acid derivative is an alkyl diester having a carbon number of 2–20, or an alkyl-substituted aryl diester having a carbon number of 10–20, (iii) said diol is a diol having a carbon number of 2–10, and the molar ratio of said diol with respect to said dicarboxylic acid or said dicarboxylic acid derivative is 1.15/1–2.20/1.

8. A polymer alloy as claimed in claim 1, wherein said epoxidized diene-based block copolymer (b) is a block copolymer (C) containing a polymer block (A) comprising a vinyl aromatic compound, and a polymer block (B) comprising a conjugated diene compound or a partially hydrogenated compound, in which there are epoxidized double bonds of unsaturated carbon in said conjugated diene compound.

9. A polymer alloy as claimed in claim 1, wherein said unvulcanized rubber (c) is at least one or more compound selected from the group consisting of a polybutadiene, a styrene-butadiene rubber, synthesized polyisoprene, a natural rubber, an isoprene-butadiene rubber, an isoprene-butadiene-styrene rubber, a nitrile rubber, a carboxylated nitrile rubber, and an EPDM.

10. A composition comprising the polymer alloy as claimed in claim 1 mixed with at least one or more of an unvulcanized rubber (d) selected from the group consisting of a synthesized rubber derived from a diene-based monomer and a natural rubber, characterized in that the total amount of the polyester resin (a) and the epoxidized diene-based block copolymer (b) is 2–25 parts by weight based on 100 parts by weight of total unvulcanized rubber in said composition.

11. A tread base, a tread cap, a carcass ply, a cushion, a belt ply, a shoulder-wedge, a bead area, an apex, or chafer, which comprises the polymer alloy as claimed in claim 1.

12. A tread base, a tread cap, a carcass ply, a cushion, a belt ply, a shoulder-wedge, a bead area, an apex, or chafer, which comprises the composition as claimed in claim 10.

13. A composition comprising:

at least one polyester resin, the resin having an acid value of 5–80 KOH mg/g;

at least one epoxidized diene-based block copolymer; and at least one unvulcanized rubber, whereby the composition has a 50% modulus of at least 2.9 MPa.

14. A composition according to claim 13, wherein the composition has a 100% modulus of at least 4.2 MPa.

15. A composition according to claim 13, wherein the composition has a 200% modulus of at least 10.5 MPa.

16. A composition according to claim 13, wherein the composition has a 300% modulus of at least 14.0 MPa.

17. A rubber composition prepared by mixing the combination of (a) at least one polyester resin having an acid value of 5–80 KOH mg/g, (b) at least one expoxidized diene-based block copolymer, and (c) at least one unvulcanized rubber, wherein the rubber composition has a 300% modulus of at least 14.0 MPa.

18. A rubber composition according to claim 17, wherein the rubber composition shows cohesive fracture in peel testing on polyester.

19. A rubber composition according to claim 17, wherein the composition has a strength in fracture of at least 19.8 MPa.

20. A rubber composition according to claim 17, where the composition has an extension in fracture of at least 430%.

* * * * *